United States Patent
von Berckheim

[11] 3,894,852
[45] July 15, 1975

[54] ELECTRODE ARRANGEMENT FOR ESTABLISHING A STEADY OR CONSTANT ELECTRIC FIELD

[76] Inventor: Constantin Graf von Berckheim, Friedrichstrasse 9, 6940 Weinheim, Germany

[22] Filed: June 13, 1974

[21] Appl. No.: 479,145

[30] Foreign Application Priority Data
June 16, 1973 Germany.......................... 2330769

[52] U.S. Cl. .................. 55/142; 55/146; 55/148; 55/150; 55/154; 98/2.11; 128/1 R; 317/262 AE
[51] Int. Cl. .................................................. B03c 3/45
[58] Field of Search ............ 55/142, 140, 146, 148, 55/150, 154, 108; 98/1, 2.11, 49, 50; 299/2, 12; 128/1 R, 190, 191 R, 362, 404; 296/136, 137 R, 137 A, 1 R; 317/4, 262 AE, 262 R; 250/534

[56] References Cited
UNITED STATES PATENTS

| | | | |
|---|---|---|---|
| 481,676 | 8/1892 | Sharp | 250/534 X |
| 1,127,897 | 2/1915 | Kellogg | 128/1.1 |
| 1,925,243 | 9/1933 | Golden | 128/413 X |
| 2,097,233 | 10/1937 | Meston | 55/154 X |
| 3,311,108 | 3/1967 | Cristofv et al. | 317/4 X |
| 3,357,159 | 12/1967 | Drenning | 55/112 |
| 3,417,302 | 12/1968 | Lueder | 317/262 AE |
| 3,483,672 | 12/1969 | Jahnke | 339/267 X |
| 3,520,172 | 7/1970 | Liu et al. | 73/28 |
| 3,531,150 | 9/1970 | Jahnke | 296/63 X |
| 3,534,530 | 10/1970 | Hornig | 128/190 X |
| 3,541,390 | 11/1970 | Jahnke | 317/4 |
| 3,583,754 | 6/1971 | von Berckheim | 296/1 |
| 3,680,281 | 8/1972 | Jahnke et al. | 236/44 C X |
| 3,695,001 | 10/1972 | Watanabe | 299/12 X |
| 3,702,526 | 11/1972 | Eichmeier | 315/111 X |

FOREIGN PATENTS OR APPLICATIONS

| | | | |
|---|---|---|---|
| 626,387 | 12/1962 | Belgium | 55/279 |
| 1,167,981 | 10/1969 | United Kingdom | 55/152 |
| 1,204,766 | 9/1970 | United Kingdom | 307/10 |
| 1,218,711 | 1/1971 | United Kingdom | 98/2.11 |
| 337,178 | 5/1959 | Switzerland | 55/150 |

*Primary Examiner*—Dennis E. Talbert, Jr.
*Attorney, Agent, or Firm*—Michael S. Striker

[57] ABSTRACT

A climate-control arrangement ionizes the air in an enclosed space, such as the interior of a room in a building or the interior of the passenger compartment of a vehicle, by establishing in such space a steady or constant electric field. The arrangement includes one or more electrodes connected to a voltage source. In particular there is provided an electrode arrangement comprised of a base structure and a plurality of individually removable cover sheets covering the base structure and preventing the build-up of dust on the base structure. In this way, when dust has built up on the exposed one of the cover sheets, such sheet can be removed to expose the next and still clean one of the plurality of cover sheets.

9 Claims, 5 Drawing Figures

ELECTRODE ARRANGEMENT FOR ESTABLISHING A STEADY OR CONSTANT ELECTRIC FIELD

BACKGROUND OF THE INVENTION

The invention relates to electrode arrangements for the establishment of steady or constant electric fields.

It is known to provide a climate control arrangement which ionizes the air in the interior of a room in a building, in the interior of land, sea and air vehicles, and in other habitable spaces. The ionization of the air in such an enclosed space, due to the establishment of a steady or constant electric field therein, is well known to have a beneficial effect upon the human occupants of such spaces.

Often the air ionizing arrangement is comprised essentially, for example, of an electrode arrangement which is connected to the positive terminal of a D.C. voltage source, with the negative terminal connected to a counter electrode or to ground; often walls and/or floor of such an enclosed space are anyway grounded.

When such a climate-control electrode arrangement is employed, ionized dust or dirt particles in the air are attracted to and become deposited upon the surface of the electrode arrangement, so that in the course of time the electrode of the arrangement becomes covered with a fairly thick layer of deposited dust or dirt. This result is sometimes actually desired for reasons of air purity. Electrostatic filters are in fact often provided for the specific purpose of removing dust or dirt from the air in this manner.

The deposition of layers of dust or dirt on the electrodes of the climate-control electrode arrangements is aesthetically displeasing. Moreover, when such layers become too thick they can even detrimentally affect the proper operation of the electrode arrangement. Accordingly, it is customary to clean the dust-covered electrode from time to time. This is somewhat tiring and annoying, and almost never completely satisfactory, since the original surface appearance of the electrode is hardly ever restored.

To overcome this difficulty, it is already known to provide the electrodes in the form of so-called "throwaway electrodes" made of thin electrically conductive cardboard or the like, and to mount them on a permanent supporting frame provided on the ceiling of the room in question. However, with this expedient, what is being done is evidently to simply completely discard an old electrode when it becomes dust-covered and to replace it with an entirely new electrode.

SUMMARY OF THE INVENTION

It is a general object of the invention to provide an electrode arrangement of the general type in question which can be maintained clean in a manner decidedly simpler and less expensive than was possible with prior-art electrode arrangements.

This object can be met by providing a base structure with a plurality of thin cover sheets which can be removed, one by one, as each successively exposed one of the plurality of sheets becomes covered with a layer of dust to an unacceptable degree.

With this arrangement, when a layer of dust builds up on the electrode arrangement, the dust will evidently cover only the outermost, exposed one of the plurality of cover sheets. Accordingly, to clean the electrode arrangement, it is merely necessary to pull off, tear off, or otherwise remove the outermost one of the plurality of cover sheets. This is a very simple operation. The supporting structure, whether it is a special frame or the base structure itself, need not be removed during the removal of the exposed one of the cover sheets.

In particular, the base structure can be constituted by an electrically conductive base layer, resulting in an electrode with removable covering sheets. Also in removing a covering sheet from a base layer it is not necessary to break the electrical connection.

It is particularly advantageous to make the cover sheets, too, electrically conductive. The higher the conductivity at the exposed surface of the electrode arrangement, the greater is the electrostatic removal of dust or dirt from the air in the enclosed space. The resulting more rapid accumulation of dust on the exposed surface of the electrode arrangement is perfectly acceptable, with the arrangement according to the invention, on account of the great ease with which the electrode arrangement of the invention can be cleaned, i.e., by simply tearing off, pulling off or otherwise removing the outermost one of the plurality of cover sheets. For example, the cover sheets can be made of metal foil, such as aluminum foil. Also, the cover sheets can be made of plastic foil which has been rendered electrically conductive either by the inclusion of electrically conductive material or by special preparation of the plastic material. The electrical conductivity of the cover sheets should not be too great. If the cover sheets are electrically conductive, then the cover sheets intermediate the outermost cover sheet and the covered electrode serve to establish electrical contact between the exposed cover sheet and the positive pole of the D.C. voltage source.

Alternatively, the cover sheets can be made of electrically insulating material. When so made the cover sheets nevertheless serve the function of making it easy to remove the dust layer from the electrode arrangement.

The individual cover sheets can be connected to each other in many different ways. In many cases the cohesive mutual attraction of two foils of the same material suffices to hold the cover sheets together. In other cases, use can be made of a non-hardening adhesive, which advantageously can be electrically conductive. Such electrically conductive adhesives are per se well known.

In order to assure that only the outermost, exposed sheet is pulled off, it is advantageous to provide the cover sheets along at least one side thereof with individually accessible tab portions. Advantageously, these tab portions can be of different lengths and overlap, like the tab portions in a pocket addressbook, for example.

The edge portions of electrode arrangements of the type in question tend to become covered with a dust layer which builds up particularly quickly, because of the high electric field concentration in the vicinity of such portions. In order to be able to easily remove the accumulated dust from such portions, it is considered advantageous to fold or wrap the ends of the cover sheets around such edge portions, so that at these portions of the electrode arrangement, too, the dust will accumulate on the cover sheet, and not on the electrode itself.

As another possibility, the base structure can be comprised of an insulator body which supports the electrode, with the periphery of the insulator body also being covered by a plurality of cover sheets which can be removed one-by-one as each successive exposed one becomes covered with dust. It is known that dust will become deposited on such an insulator body. The presence of a dust layer on the insulator body can lead to the development of creep currents along the external surface of the insulator body, especially since the insulator body is often intended to insulate a conductor maintained at a high voltage, for example 1000 or 2000 volts. By removing, one-by-one, the exposed cover sheets wrapped around the insulator body, it becomes possible to maintain the surface of the insulator structure clean in a particularly simple manner.

A particularly simple expedient is to provide the cover sheets for the insulator body in the form of a long perforated band of cover sheet material. The band is wound around the insulator body. When the exposed portion of the band becomes covered with dust, it is torn off along the perforations.

Such insulating bands are commercially available as insulator foils made of a variety of different plastics. If the successive coils of such a coiled insulating band do not adhere to each other by cohesive force to a satisfactory degree, then it is possible to provide the insulating band with an electrically insulating adhesive material, in order to maintain the coiled band in coiled condition.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
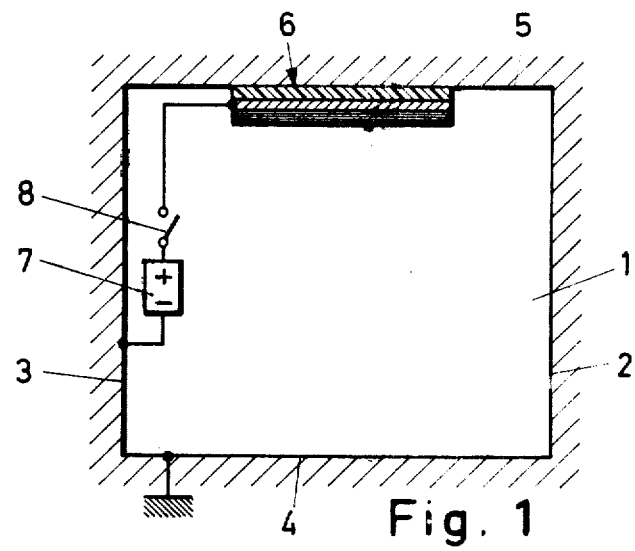
FIG. 1 is a schematic depiction of a room provided with a climate-control electrode arrangement.

There is depicted in FIG. 1 a space 1 defined by side walls 2 and 3, a floor 4 and a ceiling 5, the end walls of the spacing being present but not shown. The walls, floor and ceiling are all electrically grounded. It is to be understood that the space 1 need not be that within a room of a building, but can be the interior space of a vehicle, or any other substantially enclosed space intended for human habitation.

Figures 2, 3:
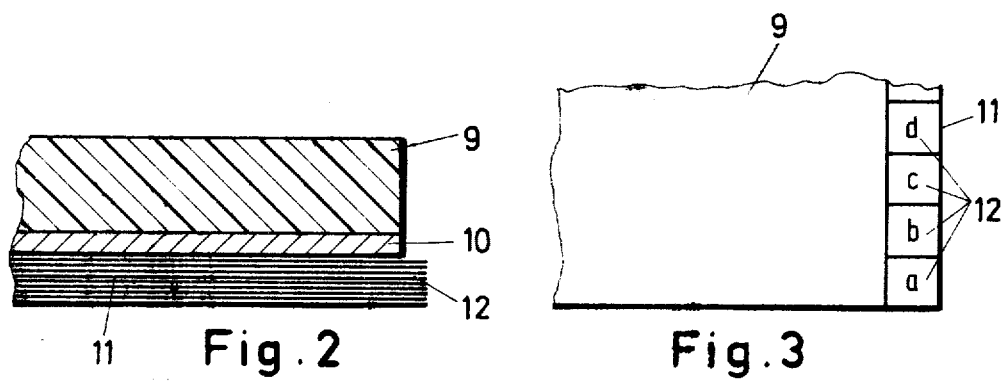
FIG. 2 is a cross-section through the electrode arrangement 6 of FIG. 1.
FIG. 3 is a plan view of a portion of the electrode arrangement 6 of FIG. 1.

Mounted on the ceiling 5 is an electrode arrangement 6, shown more clearly in FIG. 2. A D.C. voltage source 7 has a positive terminal connected via a switch 8 to the electrically conductive part of the electrode arrangement 6 and has a negative terminal which is connected to the grounded surfaces 2–5. As a result, when switch 8 is closed, there is established in the space 1 a steady or constant electric field which, due to the resulting ionization of the air in the space, has a beneficial effect upon the health of human occupants, as well known. However, at the same time, dust particles are drawn towards the ceiling electrode arrangement 6 and deposit themselves thereon to form dust layers on the lower side of the ceiling electrode arrangement 6.

The construction of the electrode arrangement is shown in FIG. 2. The electrode arrangement includes a thick layer 9 of insulating material upon which is provided a metallic and accordingly electrically conductive layer 10. Provided on the conductive layer 10 is a plurality of covering layers 11, which are also made of electrically conductive material. As soon as the lowest one of the covering layers 11 becomes covered with dust to an unacceptable degree, it can simply be pulled off the stack of layers 11. For example, between ten and twenty such layers 11 can be provided.

FIG. 3 is a partial plan view of the electrode arrangement of FIG. 2. Only the lateral overlapping tab portions 12 of the covering sheets 11 are visible. Each of these overlapping tab portions 12 has a different length, the tab portion 12 of each successively higher sheet 11 being shorter than that of the adjoining lower sheet 11. Accordingly, the bottom sheet 11 can only be grasped at the tab portion *a* thereof. After the bottom sheet 11 is pulled or ripped off the stack of sheets, only the tab portion *b* of the next cover sheet 11 can be grasped. The same applies to the tab portions *c* and *d* of the next two cover sheets 11 after removal of the preceding cover sheets.

Figure 4:
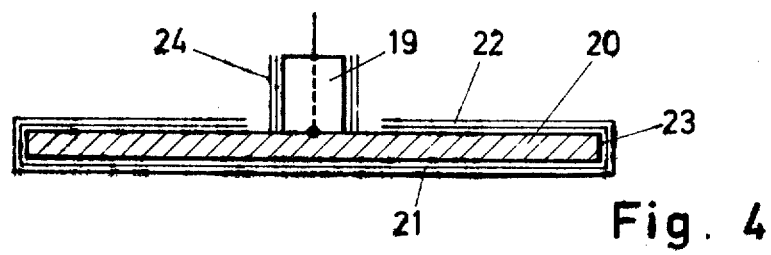
FIG. 4 is a cross-section through another embodiment of an electrode arrangement.

In the embodiment of FIG. 4, a base layer 20 is provided with a plurality of thin cover sheets 21, the ends 22 of which are folded over the edge portion 23 of of the base layer 20. When the exposed one of the sheets 21 is removed, the dust deposits along the edge portion 23 of the base layer 20 are removed together with the sheet 21. It is to be noted that the accumulation of dust and dirt at this edge region is quite substantial.

To mount the electrode arrangement on the ceiling, use is made of a cylindrical insulator body 19, the circumferential periphery of which is covered with a plurality of covering sheets 24 which can be removed one by one as each becomes unacceptably covered with dust and dirt.

Figure 5:
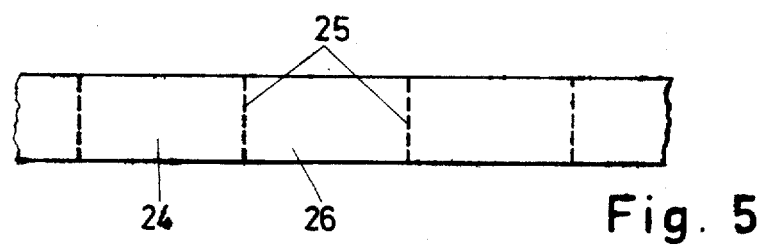
FIG. 5 depicts an uncoiled perforated cover sheet.

FIG. 5 depicts a plurality of cover sheets 24 connected end-to-end to form an elongated strip, with each section 26 of the strip being separated from the adjoining sections by perforations. The strip is coiled around the cylindrical insulator body 19 and, when the exposed portion of the strip becomes unacceptably dust-covered, such dust-covered portion is ripped off along the adjoining perforations 25. The length of each segment 26 is advantageously somewhat greater than the circumference of the cylindrical insulator body 19.

It will be understood that each of the elements described above, or two or more together, may also find a useful application in other types of constructions differing from the types described above.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. In a climate-control arrangement of the type which ionizes the air in an enclosed habitable space, such as the interior of a room in a building or the interior of the passenger compartment of a vehicle, by establishing in said space an electric field, an improved electrode arrangement comprising, in combination, a base structure and a plurality of individually removable cover sheets covering said base structure and preventing the build-up of dust on said base structure, whereby when dust has built up on the exposed one of said cover sheets such sheet can be removed to expose the next and still clean one of said cover sheets.

2. In an arrangement as defined in claim 1, wherein said base structure is comprised of an electrically conductive portion constituting an electrode.

3. In an arrangement as defined in claim 2, wherein said cover sheets are made of electrically conductive material.

4. In an arrangement as defined in claim 3, wherein said cover sheets are made of metal foil.

5. In an arrangement as defined in claim 3, wherein said cover sheets are made of electrically conductive plastic foil.

6. In an arrangement as defined in claim 1, wherein said cover sheets are provided with respective lapping tab portions, to facilitate removal of individual ones of said sheets.

7. In an arrangement as defined in claim 1, wherein said base structure has a flat major surface and edge portions, and wherein said cover sheets are wrapped around said edge portions.

8. In an arrangement as defined in claim 1, wherein said base structure comprises an insulator body supporting an electrically conductive body, and wherein said cover sheets cover said insulator body.

9. In an arrangement as defined in claim 8, wherein said cover sheets are provided in the form of an elongated band wound repeatedly around said insulator body, and wherein said band is provided with longitudinally spaced transverse rows of perforations to facilitate the tearing off from said wound band of the exposed portion of the band when such exposed portion has become covered with dust.

* * * * *